United States Patent
Ives et al.

(10) Patent No.: US 11,683,412 B2
(45) Date of Patent: Jun. 20, 2023

(54) AUTOMATED GENERATION OF ENHANCED CALLER IDENTIFICATION DATA

(71) Applicant: T-Mobile USA, Inc., Bellevue, WA (US)

(72) Inventors: Derrick Ives, North Bend, WA (US); Ovidiu Serban, Sammamish, WA (US); Adriana Padilla, Shoreline, WA (US); Samantha Klemm, Seattle, WA (US); Vanda Oliveira, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/479,817

(22) Filed: Sep. 20, 2021

(65) Prior Publication Data

US 2023/0089573 A1 Mar. 23, 2023

(51) Int. Cl.
*H04M 3/42* (2006.01)
*H04M 3/533* (2006.01)

(52) U.S. Cl.
CPC ....... *H04M 3/42059* (2013.01); *H04M 3/533* (2013.01)

(58) Field of Classification Search
CPC .......................... H04M 3/42059; H04M 3/533
USPC .................................................... 379/142.04
See application file for complete search history.

(56) References Cited

U.S. PATENT DOCUMENTS

| | | | |
|---|---|---|---|
| 8,085,916 B2 | 12/2011 | Walsh et al. | |
| 8,149,848 B2 | 4/2012 | Karaoguz et al. | |
| 8,433,305 B2 | 4/2013 | Kaplan et al. | |
| 8,730,974 B2 | 5/2014 | Karaoguz et al. | |
| 9,203,954 B1 * | 12/2015 | Van Rensburg .. | H04M 3/42059 |
| 9,338,289 B1 * | 5/2016 | Goyal ............... | H04M 3/42042 |
| 9,444,946 B2 | 9/2016 | White et al. | |
| 9,900,661 B2 | 2/2018 | Pearson et al. | |
| 10,587,750 B2 | 3/2020 | Rensburg et al. | |
| 10,771,624 B1 * | 9/2020 | Penar ....................... | H04L 63/08 |
| 11,330,406 B1 * | 5/2022 | Garg ....................... | H04W 4/16 |
| 11,431,833 B1 * | 8/2022 | Smith-Rose ...... | H04M 1/72469 |
| 2002/0067816 A1 * | 6/2002 | Bushnell ........... | H04M 3/42153 |
| | | | 379/142.01 |

(Continued)

*Primary Examiner* — Binh Kien Tieu
(74) *Attorney, Agent, or Firm* — Han Santos, PLLC (57) ABSTRACT

Methods, systems, and apparatus, including computer programs encoded on a computer storage medium, for automatically generating enhanced caller identification data are disclosed. In one aspect, a method includes the actions of receiving telephone call placement data that indicates the placement of a telephone call from a calling party to a called party. The actions further include receiving caller identification data. The actions further include accessing first telephone call data that reflects characteristics of telephone calls placed and received by the calling party. The actions further include based on the first telephone call data and the identity of the calling party, determining additional data to combine with the caller identification data. The actions further include generating enhanced caller identification data by combining the additional data with the caller identification data. The actions further include providing, for output, the enhanced caller identification data and data indicating the telephone call.

20 Claims, 3 Drawing Sheets

(56) References Cited

U.S. PATENT DOCUMENTS

| | | | | |
|---|---|---|---|---|
| 2003/0112941 | A1* | 6/2003 | Brown | H04M 15/58 379/196 |
| 2005/0232247 | A1* | 10/2005 | Whitley | H04L 12/2803 370/338 |
| 2010/0303219 | A1* | 12/2010 | Michaelis | H04M 3/42042 379/93.23 |
| 2010/0317341 | A1* | 12/2010 | Ferren | H04M 1/663 455/566 |
| 2015/0181023 | A1* | 6/2015 | Citron | H04M 3/42059 379/207.02 |
| 2015/0181397 | A1* | 6/2015 | Dudai | H04Q 3/00 455/405 |
| 2016/0029202 | A1* | 1/2016 | Leno | H04L 65/1104 455/414.1 |
| 2016/0349932 | A1* | 12/2016 | Gorny | G06F 40/186 |
| 2021/0183374 | A1* | 6/2021 | Thomson | G10L 15/30 |

* cited by examiner

AUTOMATED GENERATION OF ENHANCED CALLER IDENTIFICATION DATA

BACKGROUND

Caller identification is a telephone service that transmits a caller's telephone number to the called party's telephone equipment when the call is being set up. The caller identification service may include the transmission of a name associated with the calling telephone number. The information received from the service may be displayed on a screen of the called party's telephone equipment or a separate screen.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Enhanced caller identification provides an entity the opportunity to present customized content when placing a call to a called party. The enhanced caller identification content may appear on the phone of the called party when the phone is ringing. The enhanced caller identification may include a logo for the entity, a likely subject of the call, and/or any other helpful information for the called party. In some instances, the entity may manually provide the enhanced caller identification information to the service provider at the time of placing the call or in advance. This can be cumbersome for a person to do before each call, which may result in the person not providing the information before placing the call. It would be beneficial if the telephone service provider were able to identify the appropriate enhanced caller identification information without relying on someone to manually provide the data.

To automatically identify the appropriate content for the enhanced caller identification, a service provider may analyze various data sources such as a website that corresponds to the entity assigned to the calling number, data related to previous calls from the calling number, data related to previous calls between the calling number and the called number, and/or any other similar information. The service provider may identify a logo, a photo of a likely caller, and/or any other similar identifying information. The data related to previous calls may include transcripts of the calls, dates and times of the calls, durations of the calls, and/or any other similar information. The service provider may analyze that data to determine the likely subject matter for a subsequent call with the same called party. The service provider may also analyze that data to determine the likely subject matter for a call with a called party with whom the entity has not previously contacted on the phone.

Figure 1:
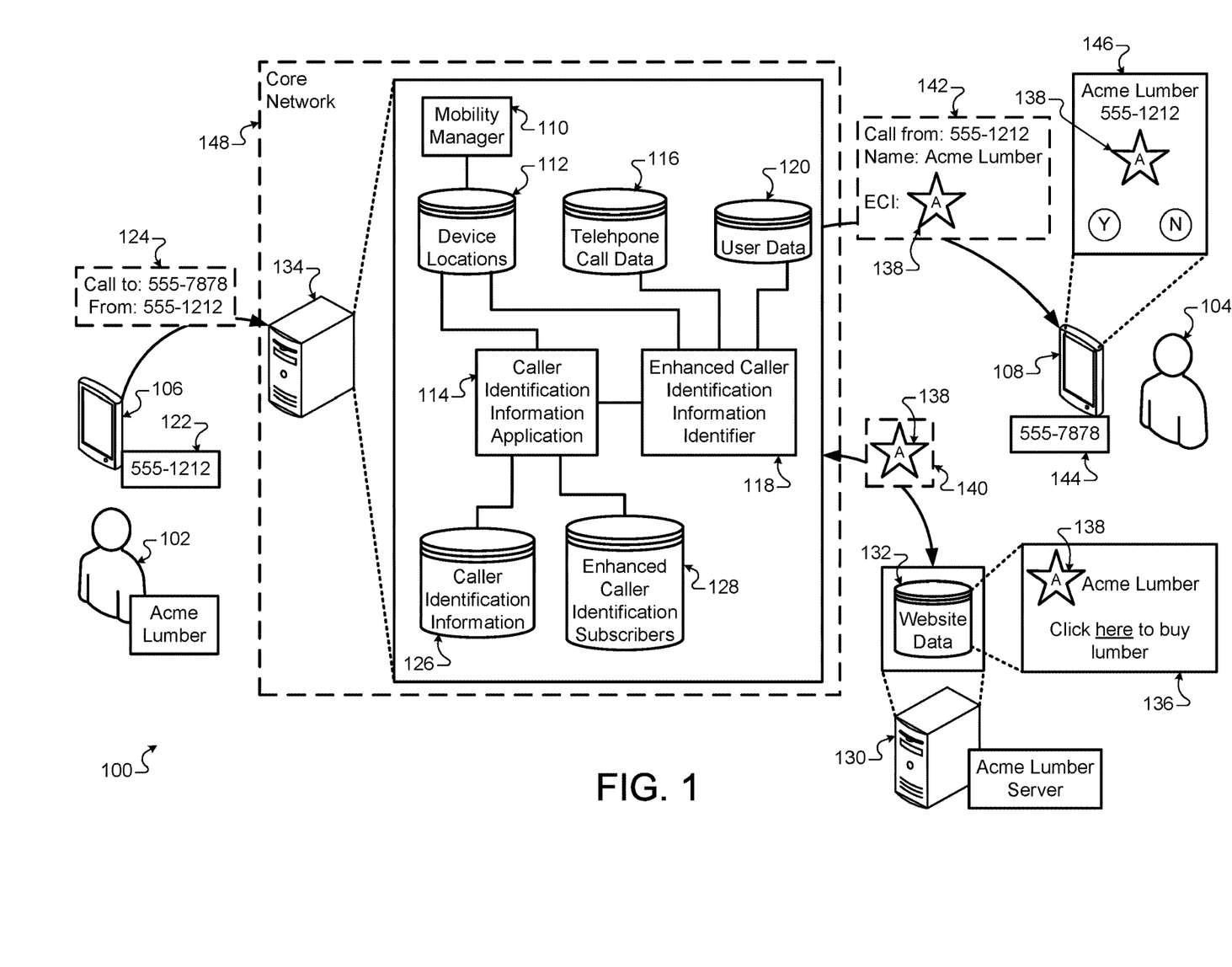
FIG. 1 illustrates an example system that is configured to automatically generate enhanced caller identification information for presentation to a called party.

FIG. 1 illustrates an example system 100 that is configured to automatically generate enhanced caller identification information for presentation to a called party. Briefly, and as described in more detail below, system 100 is configured to received telephone call requests from computing devices. In response to a telephone call request 124, the system 100 generates and transmits, to a called computing device, a notification 142 of the incoming telephone call. The system 100 determines whether to include enhanced caller identification information in the notification 142. The enhanced caller identification information can include additional information identifying the calling party, a likely subject matter for the call, and/or any other helpful information for the called party.

In more detail, the user 102 is interacting with the computing device 106. The computing device 106 may be any type of device that is configured to place a telephone call. For example, the computing device 106 may be a mobile phone, tablet, smart watch, wearable device, laptop computer, desktop computer, and/or any other similar device. The phone number 122 of the computing device 106 may be 555-1212. The computing device 106 may include a telephone application with which the user 102 interacts to place a telephone call. For example, the user 102 may interact with the telephone application to call the telephone number 555-7878.

The telephone application of the computing device 106 may transmit a telephone call request 124 to the server 134. The server 134 may be included in or in communication with a network such as a wireless carrier network that provides voice and data communication services to multiple devices, such as the computing devices 106 and 108 and other devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5th Generation (5G) wireless systems, CDMA-2000 (Code Division Multiple Access 2000), and/or other similar standards. In some implementations, the server 134 may communicate with the computing devices 106 and 108 and other devices using a Wi-Fi network, short range radio, infrared communication, and/or any other similar communication technique.

The wireless carrier network may include a radio access network and a core network 148. The radio access network may include multiple base stations. The multiple base stations are responsible for handling voice and/or data traffic between multiple devices, such as the computing devices 106 and 108 and other devices and the core network 148. Accordingly, each of the base stations may provide a corresponding network cell that delivers telecommunication and data communication coverage. The core network 148 may use the network cells to provide communication services to the multiple subscriber devices. For example, the core network 148 may connect the multiple devices to other telecommunication and data communication networks, such as the Internet and the public switched telephone network (PSTN). The base stations are responsible handling voice and data traffic between devices and the core network 148. In some implementations, the base stations may be in the form of eNodeB nodes. Each eNodeB node may include a base transceiver system (BTS) that communicates via an antenna system over an air-link with one or more devices that are within range. The antenna system of an eNodeB node may include multiple antennas that are mounted on a radio tower to provide a coverage area that is referred to as a "cell." The BTS may send RF signals to devices and receive radio signals from devices.

The server 134 may receive the telephone call request 124 and generate a telephone call notification 142 to notify the computing device 108 of the incoming telephone call. The server 134 may include a caller identification information application 114 that is configured to identify information to include in the telephone call notification 142. That information may include a name of the user 102 and/or a name of the entity that the user 102 represents. The caller identification information application 114 may also be configured to determine whether to include an additional information in the telephone call notification 142. The additional information can include a likely subject for the telephone call, data that represents the entity of the user 102, and/or any other relevant information for the telephone call.

The caller identification information application 114 may receive the telephone call request 124. The telephone call request 124 may include the phone number 122 of the computing device 106 placing the telephone call and the phone number 144 of the computing device 108 that the user 102 is calling. For example, the phone number of the computing device 108 in the telephone call request 112 may be 555-7878 and the phone number of the computing device 106 may be 555-1212. The caller identification information application 114 may access the caller identification information 126. The caller identification information 126 may include name and phone number pairs for the phone numbers of the wireless carrier network. In the example of FIG. 1, the caller identification information application 114 may access the caller identification information 126 and determine that the name that corresponds to the number 555-1212 is Acme Lumber. The caller identification information application may include the name "Acme Lumber" in the telephone call notification 142.

In some implementations, the caller identification information 126 may be stored on the server 134. In some implementations, the caller identification information may be stored in a database, an external computing device, and/or third-party computing device that the server 134 accesses. In some implementations, the server 134 may periodically provide the caller identification information 126 to the third-party computing device so that the third-party computing device can update other caller information data with the data included in the caller identification information 126. In some cases, the server 134 may access the caller information data of the third-party computing device if the caller information data 126 of the server 134 does not include a corresponding name for the phone number 122 of the computing device 106 placing the telephone call. In some implementations, the server 106 may access the caller information data of the third-party computing device to update the caller identification information 126.

In some implementations, the caller identification information application 114 may access the device locations 112. The device locations 112 may include data identifying the location of the computing devices that are communicating with the server 134. The caller identification information application 114 may access the device locations 112 to determine the location of the computing device 106. The device locations 112 may store data that relates data identifying a computing device, such as the phone number, to the location of the computing device. The caller identification information application 114 may include the location of the computing device 106 in the telephone call notification 142.

The server 134 may include a mobility manager 110. The mobility manager 110 may be configured to monitor the location of the computing devices 106 and 108 that are connected to the server 134 through a wireless base station. The location of the computing devices 106 and 108 may include the location of the wireless base station to which the computing devices 106 and 108 are connected and/or GPS data received from the computing devices 106 and 108. The mobility manager 110 may store the location data in the device locations 112 of the server 134.

In some implementations, the mobility manager 110 may determine the location of a computing devices 106 and 108 at periodic intervals, such as every five seconds. In some implementations, the mobility manager 110 may determine the location of a computing devices 106 and 108 when the computing devices 106 and 108 connect to a different wireless base station and/or provide updated GPS data. In some implementations, the mobility manager 110 may determine the location of the computing devices 106 and 108 relative to the base station with which the computing device is communicating. In this case, the mobility manager 110 may determine the relative location based on data collected from the base station such as signal strength and direction of communications between the computing devices 106 and 108 and the base station. The mobility manager 110 may also determine the relative location based on the location of the base station and GPS data received from the computing devices 106 and 108. The relative location data may include a distance between the computing devices 106 and 108 and the base station, the cardinal direction from the base station to the computing devices 106 and 108, and/or any other similar measurements.

The caller identification information application 114 may be configured to access the enhanced caller identification subscribers 128. The enhanced caller identification subscribers 128 may include data identifying the users or customers of the wireless carrier network who subscribe to the enhanced caller identification service. A user may subscribe to the enhanced caller identification service so that additional information related to calls that the user places will include enhanced caller identification information and/or so that additional information related to calls that the user receives will include enhanced caller identification information. The user may subscribe to the service for placing telephone calls or receiving telephone calls or both. In some cases, a user may pay monthly subscription fee and/or a one-time fee. The enhanced caller identification subscribers 128 may include data that identifies the user, such as a phone number, account number, name, data identifying a computing device of the user, and/or any other similar identifying information. The data identifying the user may indicate whether the subscription is for place telephone calls and/or received telephone calls and whether the subscription is active, expired, unsubscribed, or any other similar subscription indicator.

In the example of FIG. 1, the caller identification information application 114 may access the enhanced caller identification subscribers 128. The caller identification information application 114 may determine that the phone number 122 of the computing device 106, which is 555-1212 has an active subscription to the enhanced caller identification service. In this case, the caller identification information application 114 may request that the enhanced caller identification information identifier 118 identify additional information to include in the telephone call notification 142.

The server 134 may include the enhanced caller identification information identifier 118. The enhanced caller identification information identifier 118 may be configured to identify additional data that is related to the user 102 and/or related to the telephone call between the user 102 and the user 104. The data that is related to the user 102 may include an image of the user 102, an image that represents the entity that the user 102 represents, an image selected by the user 102 or an entity of the user 102, and/or any other similar information. The data that is related to the telephone call may include a likely subject of this telephone call, a subject of a previous telephone call between the user 102 and the user 104, and/or any other similar information.

The enhanced caller identification information identifier 118 may be configured to analyze various sources of data to identify additional data that is related to the user 102 and/or related to the telephone call between the user 102 and the user 104. Those sources may include the telephone call data 116, the user data, and/or external sources. The telephone call data 116 may include data related to the incoming and outgoing telephone calls of the computing devices 106 and 108 and other computing devices. The telephone call data 116 may include data indicating the date, time, and/or the duration of the telephone call. The telephone call data 116 may also include data indicating whether the called party answered the telephone call, whether the voicemail system answered the telephone call, and/or whether the calling party left a voicemail. The telephone call data 116 may also include data identifying the calling party and data identifying the called party. The data identifying the calling party may include a phone number of the calling party, a name of the calling party, a geographic location of the calling party at the time of the call, a network location of the calling party at the time of the call, data identifying a computing device used by the calling party, and/or any other similar information of the calling party. The data identifying the called party may include a phone number of the called party, a name of the called party, a geographic location of the called party at the time of the call, a network location of the called party at the time of the call, data identifying a computing device used by the called party and/or any other similar information of the called party. In some implementations, the telephone call data 116 may include transcriptions of the previous telephone conversations and/or audio of the previous telephone conversations.

The users 102 and 104 may use the computing devices 106 and 108 for more than placing and receiving telephone calls. The computing devices 106 and 108 may be any type of device that is configured to communicate with other computing devices through a wired or wireless connection. The computing devices 106 and 108 may utilize a voice communication channel for telephone calls and a data communication channel for other communications. As an example, the computing devices 106 and/or 108 may be mobile phones. The users 102 and 104 may use the computing devices 106 and 108 to access the internet through various mobile phone applications that utilize the data communication channel. The computing devices 106 and/or 108 may also be tablets, laptop computers, desktop computers, wearable devices, and/or any other similar device. In some implementations, the computing devices 106 and 108 may use the data communication channel for telephone calls, such as voice over internet protocol calls.

The user data 120 may include data related to the incoming and outgoing data of the computing devices 106 and 108 and other computing devices. The user data 120 may be related to the incoming and outgoing data of the data communication channel. The user data 120 may include a date, time, duration of the data exchange, and/or the amount of data exchanged. The user data 120 may include text exchanged between the computing devices 106 and 108 and other computing devices such as through messaging applications and/or email applications. The user data 120 may also include data indicating a geographic and network location of the computing device with which the computing devices 106 or 108 was communicating. The user data 120 may include data identifying an application on the computing devices 106 or 108 that interacted with the data exchanged. In some implementations, the user data 120 may also include configurations that the user 102 and/or 104 has set or preset configurations on the computing devices 106 and/or 108. These configurations may include whether the computing devices 106 and/or 108 are set to block calls during certain times of the day, block calls during calendar appointments, and/or any other similar phone call related configurations.

External sources may include publicly accessible information such as information on various websites and social media information associated with the user 102, an entity of the user 102, the user 104, and/or an entity of the user 104. The enhanced caller identification information identifier 118 may identify the various websites and social media information based on the user data 120. The user data 120 may include data indicating websites that users have accessed. These likely include websites of entities of the users 102 and 104 and social media data accessed through a browser and applications on the computing devices 106 and 108.

The enhanced caller identification information identifier 118 may receive the request from the caller identification information application 114 to identify additional data to add to the telephone call notification 142. The request may include the phone number 122 of the calling computing device 106, the phone number 108 of the called computing device 108, caller identification data of the user 102, and/or caller identification data of the user 104. The enhanced caller identification information identifier 118 may access the device locations 112, the telephone call data 116, and/or the user data 120.

The enhanced caller identification information identifier 118 may access the telephone call data 116. The enhanced caller identification information identifier 118 may determine the calling history between the user 102 and the user 104. The calling history may include the time, date, and/or duration of previous telephone calls between the user 102 and the user 104. The telephone call data 116 may also include transcriptions and/or audio of the previous telephone calls between the user 102 and the user 104. The enhanced caller identification information identifier 118 may analyze the transcriptions of previous telephone calls between user 102 and the user 104 to determine the subject matter of the previous telephone calls. If the user 102 and the user 104 had a previous telephone call within a threshold period of time from the current telephone call, then the enhanced caller identification information identifier 118 may determine that the subject matter of the current telephone call is likely similar to the subject matter of that previous telephone call between the user 102 and the user 104. The enhanced caller identification information identifier 118 may provide the likely subject of the telephone call to the caller identification information application 114 for inclusion in the telephone call notification 142.

The telephone call data 116 may also include the calling history of the user 102 with users other than the user 104. The enhanced caller identification information identifier 118 may analyze the previous telephone calls between the user 104 and other users. The enhanced caller identification information identifier 118 may determine the subject matter of those telephone calls by analyzing the transcriptions of those telephone calls. If some of those telephone calls where within a threshold period of time of the current telephone call and the subject matter of those telephone calls were the same, then the enhanced caller identification information identifier 118 may determine that the subject matter of the current telephone call is likely the same as those previous telephone calls within the threshold period of time. The enhanced caller identification information identifier 118 may provide the likely subject of the telephone call to the caller identification information application 114 for inclusion in the telephone call notification 142.

The enhanced caller identification information identifier 118 may access the user data 120. The enhanced caller identification information identifier 118 may determine the communication history between the user 102 and the user 104. The communication history may include the time, date, and/or duration of previous communications, such as text-based communications, between the user 102 and the user 104. The enhanced caller identification information identifier 118 may analyze the text-based communications between user 102 and the user 104 to determine the subject matter of the previous text-based communications. If the user 102 and the user 104 had a previous text-based communication within a threshold period of time from the current telephone call, then the enhanced caller identification information identifier 118 may determine that the subject matter of the current telephone call is likely similar to the subject matter of that previous text-based communication between the user 102 and the user 104. The enhanced caller identification information identifier 118 may provide the likely subject of the telephone call to the caller identification information application 114 for inclusion in the telephone call notification 142.

The user data 120 may also include the calling history of the user 102 with users other than the user 104. The enhanced caller identification information identifier 118 may analyze the previous communications, such as text-based communications, between the user 104 and other users. The enhanced caller identification information identifier 118 may determine the subject matter of those text-based communications. If some of those text-based communications where within a threshold period of time of the current telephone call and the subject matter of those text-based communications were the same, then the enhanced caller identification information identifier 118 may determine that the subject matter of the current telephone call is likely the same as those text-based communications within the threshold period of time. The enhanced caller identification information identifier 118 may provide the likely subject of the telephone call to the caller identification information application 114 for inclusion in the telephone call notification 142.

In some implementations, the enhanced caller identification information identifier 118 may access the device locations 112. The enhanced caller identification information identifier 118 may determine the location of the computing device 106 and/or the computing device 108. The enhanced caller identification information identifier 118 may determine the location of the various computing devices involved in the voice and text-based communications included in the telephone call data 116 and the user data 120. The enhanced caller identification information identifier 118 may relate the subject matter of the previous communications to the locations of the computing devices. In some instances, the enhanced caller identification information identifier 118 may not determine a correlation between location and subject matter. In this case, the enhanced caller identification information identifier 118 may not determine a likely subject of the current telephone call based on the location of the computing device 106 and/or the computing device 108. In some instances, the enhanced caller identification information identifier 118 may determine a correlation between location and subject matter. This may occur if a majority of the communications in a location are related to the same subject matter. For example, when the computing device 106 is at a particular location, the majority of the subject matters of the communications are related to lumber delivery. In this case, if the computing device 106 is at the particular location during the placement of the current telephone call, then the enhanced caller identification information identifier 118 may provide the likely subject of a lumber delivery to the caller identification information application 114 for inclusion in the telephone call notification 142.

The enhanced caller identification information identifier 118 may access external resources to identify additional data to provide to the caller identification information application 114 for inclusion in the telephone call notification 124. Some of those external sources may include various websites and social media information associated with the user 102, an entity of the user 102, the user 104, and/or an entity of the user 104, for example; the identifiers are not limited to websites and/or social media information. The enhanced caller identification information identifier 118 may identify a name of the user 102, an entity of the user 102, the user 104, and/or an entity of the user 104 by accessing the corresponding account information, for example; the identifiers are not limited to names. The enhanced caller identification information identifier 118 may access account information based on the phone number 122 and/or the phone number 144. The account information may include a name, and the enhanced caller identification information identifier 118 may use, by way of example and without limitation, a search engine to identify website and/or social media pages of the user 102, an entity of the user 102, the user 104, and/or an entity of the user 104.

In some implementations, the enhanced caller identification information identifier 118 may identify, by way of example and without limitation, a name of the user 102, an entity of the user 102, the user 104, and/or an entity of the user 104 by analyzing the telephone call data 116, the user data 120, and/or the device locations 112. For example, the transcriptions of the previous telephone calls of the user 102 may include the phrase "Thank you for calling Acme Lumber." In this case, the enhanced caller identification information identifier 118 may determine that the user 102 represents the entity Acme Lumber. As another example, the text-based communications of the user 102 may include the phrase "I'm with Acme Lumber." In this case, the enhanced caller identification information identifier 118 may determine that the user 102 represents the entity Acme Lumber.

In some implementations, the enhanced caller identification information identifier 118 may identify, for example and without limitation, a name of the user 102, an entity of the user 102, the user 104, and/or an entity of the user 104 by analyzing the device locations 112. For example, the computing device 106 of the user 102 may be at a particular location when the user 102 is placing the majority of the telephone calls. The enhanced caller identification information identifier 118 may determine that particular location corresponds to the location of Acme Lumber by accessing a search engine or a map website on the internet. In this case, the enhanced caller identification information identifier 118 may determine that the user 102 represents the entity Acme Lumber.

Based on determining a name of the user 102 and/or a name of the entity of the user 102, the enhanced caller identification information identifier 118 may use a search engine to identify additional information related to the user 102 and/or the entity. The enhanced caller identification information identifier 118 may use the search engine to identify a webpage and/or social media page of the user 102 and/or the entity. The enhanced caller identification information identifier 118 may analyze the webpage and/or social media page for identifying information of the user 102 and/or the entity. This may include a logo or other symbol. The enhanced caller identification information identifier 118 may analyze the images linked on the source of the webpage to determine whether any include "logo" in the filename. The enhanced caller identification information identifier 118 may also identify images that appear in each page to which the main webpages. A frequently appearing image may indicate that the image is a logo of the entity. The enhanced caller identification information identifier 118 may identify the profile picture on social media pages. The enhanced caller identification information identifier 118 may use the profile picture from the social media page and/or the logo as the additional information to provide to the caller identification information application 114.

In the example of FIG. 1, the enhanced caller identification information identifier 118 may determine that the name of the entity of the user 102 is Acme Lumber. The enhanced caller identification information identifier 118 may determine the name based on account information and/or analyzing the telephone call data 116, the user data 120, and/or the device locations 112. The enhanced caller identification information identifier 118 may provide "Acme Lumber" as a search string to a search engine. The search engine may identify a website 136 of Acme Lumber. The website data 132 for the website 136 may be stored on the third-party server 130. The enhanced caller identification information identifier 118 may analyze the website 136 and identify the logo 138 of Acme Lumber. The enhanced caller identification information identifier 118 may provide the logo 138 as the additional information to provide to the caller identification information application 114.

The caller identification information application 114 may receive the logo 138. The caller identification information application 114 may include the logo 138 in the telephone call notification 142 as the enhanced caller identification information. The caller identification information application 114 may transmit the telephone call notification 142 to the computing device 108. The telephone call notification 142 may include the phone number 122 of the computing device, the caller identification information of the user 102, and the logo 138. The telephone call notification 142 may also include instructions for presenting the logo 138. For example, the instructions may indicate to display the logo 138 below the caller identification information of the user 102, above the caller identification information of the user 102, or any other location.

The computing device 108 may receive the telephone call notification 142. In response, the computing device 108 may ring and/or output another type of notification indicating the incoming call. The computing device 108 may output, on the display of the computing device 108, an interface 146 that includes the phone number 122 of the computing device, the caller identification information of the user 102, and the logo 138. The interface 146 may also include selectable options for the user 104 to accept or reject the incoming telephone call.

Figure 2:
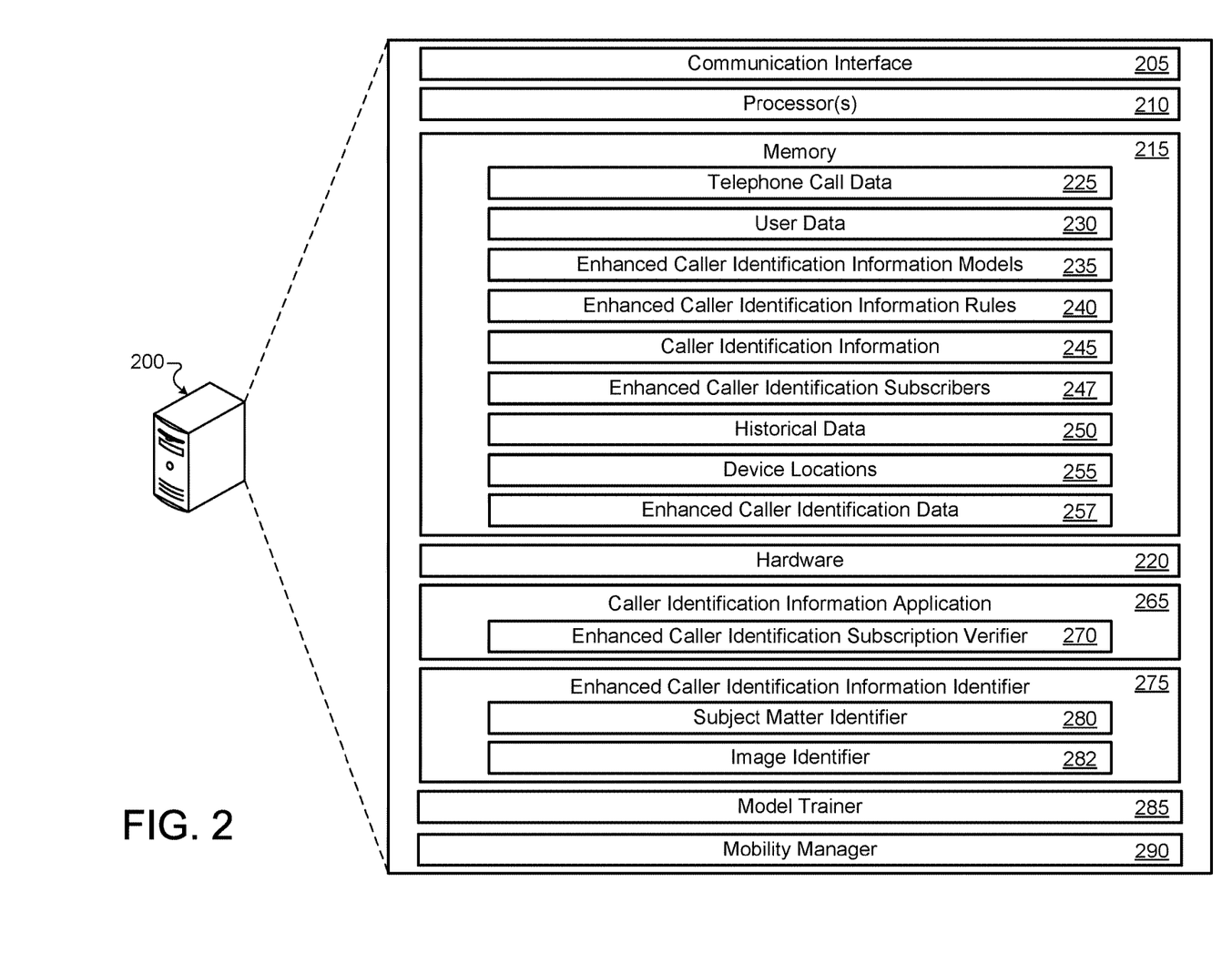
FIG. 2 illustrates an example server that is configured to automatically identify enhanced caller identification information for presentation to a called party.

FIG. 2 illustrates an example server that is configured to automatically identify enhanced caller identification information for presentation to a called party. The server 200 may be any type of computing device that is configured to communicate with other computing devices. The server 200 may be integrated into a wireless carrier network or interact with a wireless carrier network. The server 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The server 200 may be similar to the server 134 of FIG. 1. Some of the components of the server 200 may be implemented in a single computing device or distributed over multiple computing devices. For example, components of the server 200 may be implemented in the server 134, the computing device 106, and/or the computing device 108. Some of the components may be in the form of virtual machines or software containers that are hosted in a cloud in communication with disaggregated storage devices.

The server 200 may include a communication interface 205, one or more processors 210, memory 215, and hardware 220. The communication interface 205 may include communication components that enable the server 200 to transmit data and receive data from devices connected to the wireless carrier network. The communication interface 205 may include an interface that is configured to communicate with base stations of a wireless carrier network. The communication interface 205 may receive data that other devices transmit to the base stations and/or transmit data to the base stations for transmission to the other devices. In some implementations, the communication interface 205 may be configured to communicate over a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. In some implementations, the data stored in the memory 215 may stored externally from the server 200.

The one or more processors 210, through the execution of computer-executable instructions stored in the memory 215, may implement a mobility manager 290. The mobility manager 290 may be similar to the mobility manager 110 of FIG. 1. The mobility manager 290 may be configured to monitor the location of a computing device that is connected to the server 200 through a wireless base station. The location of the computing device may include the location of the wireless base station to which the computing device is connected and/or GPS data received from the computing device. The mobility manager 290 may store the location data in the device locations 255 of the server 200.

In some implementations, the mobility manager 290 may determine the location of a computing device at periodic intervals, such as every five seconds. In some implementations, the mobility manager 290 may determine the location of a computing device when the computing device connects to a different wireless base station and/or provides updated GPS data. In some implementations, the mobility manager 290 may determine the location of the computing device relative to the base station with which the computing device is communicating. In this case, the mobility manager 290 may determine the relative location based on data collected from the base station such as signal strength and direction of communications between the computing device and the base station. The mobility manager 290 may also determine the relative location based on the location of the base station and GPS data received from the computing device. The relative location data may include a distance between the computing device and the base station, the cardinal direction from the base station to the subscriber device, and/or any other similar measurements.

The memory 215 may store telephone call data 225 that is related to the incoming and outgoing telephone calls of various computing devices. The telephone call data 225 may be similar to the telephone call data 116 of FIG. 1. The telephone call data 225 may include data indicating the date, time, and/or the duration of a telephone call. The telephone call data 225 may also include data indicating whether the called party answered the telephone call, whether the voicemail system answered the telephone call, and/or whether the calling party left a voicemail. The telephone call data 225 may also include data identifying the calling party and data identifying the called party. The data identifying the calling party may include a phone number of the calling party, a name of the calling party, a geographic location of the calling party at the time of the call, a network location of the calling party at the time of the call, data identifying a computing device used by the calling party, and/or any other similar information of the calling party. The data identifying the called party may include a phone number of the called party, a name of the called party, a geographic location of the called party at the time of the call, a network location of the called party at the time of the call, data identifying a computing device used by the called party and/or any other similar information of the called party.

The memory 215 may store user data 230 that is related to the data communications and related actions of the various computing devices communicating with other computing devices through the server 200. The user data 230 may be similar to the user data 120 of FIG. 1. The user data 230 includes data related to the incoming and outgoing data of the computing devices. The user data 230 may be related to the incoming and outgoing data of the data communication channel. The user data 230 may include a date, time, duration of the data exchanged, and/or the amount of data exchanged. The user data 230 may also include data indicating a geographic and network location of the other computing device with which the computing device. The user data 120 may include data identifying an application on the computing device that interacted with the data exchanged. The user data 230 may include data identifying the computing devices involved in the data exchange.

The memory 215 may store the caller identification information 245. The caller identification information 245 may be similar to the caller identification information 126 of FIG. 1. The caller identification information 126 may include name and phone number pairs for the phone numbers of the wireless carrier network. In some instances, phone numbers may be associated with more than one name. For example, the phone number 555-1212 may be associated with Alice and Alice's employer, Acme Lumber.

The one or more processors 210 may implement, through the execution of computer-executable instructions stored in the memory 215, the caller identification information application 265. The caller identification information application 265 may be similar to the caller identification information application 114 of FIG. 1. The caller identification information application 265 is configured to identify information to include in a telephone call notification. That information may include a name calling party and/or a name of the entity that the calling party represents. The caller identification information application 265 may include an enhanced caller identification subscription verifier 270 that is configured to determine whether to include any additional information in the telephone call notification. The additional information can include a likely subject for the telephone call, data that represents the entity of the calling party, and/or any other relevant information for the telephone call.

The caller identification information application 265 may receive a telephone call request from a calling device placing a telephone call. The request may include the phone number of the calling device and the phone number of the called device. The caller identification information application 265 may access the caller identification information 245 and/or a third party device that also include caller identification information to determine a name that corresponds to the phone number of the calling device. The caller identification information application 265 may generate a telephone call notification that includes the phone number of the calling device, a name that corresponds to the phone number of the calling device, and any additional identified by the enhanced caller identification information identifier 275.

The enhanced caller identification subscription verifier 270 may access the enhanced caller identification subscribers 247. The enhanced caller identification subscribers 247 may include data related to the users who have subscribed to the enhanced caller identification service. The enhanced caller identification subscribers 247 may store data that relates a user, account holder, phone number, entity, and/or any other identifying information to the subscription status of the enhanced caller identification service. The subscription status may indicate whether the subscription to the enhanced caller identification service is active or inactive. An inactive status can indicate whether a user never subscribed, subscribed and later canceled, subscribed and did not pay, or any other similar reason.

The enhanced caller identification subscription verifier 270 may take different actions depending on the subscription status of the calling party. If the subscription status is active, then the enhanced caller identification subscription verifier 270 may take the steps to identify additional data to include in the telephone call notification. If the subscription status is never subscribed, then the enhanced caller identification subscription verifier 270 may bypass taking the steps to identify additional data to include in the telephone call notification. If the subscription status is cancelled for lack of payment, then the enhanced caller identification subscription verifier 270 may bypass taking the steps to identify additional data to include in the telephone call notification and notify the pay the balance to continue the enhanced caller identification service. If the subscription status is cancelled by the user, then the enhanced caller identification subscription verifier 270 may bypass taking the steps to identify additional data to include in the telephone call notification and inquire with the calling party regarding renewing the subscription.

In some implementations, a called party may request that the enhanced caller identification be added to the caller identification information for incoming telephone calls. The enhanced caller identification subscription verifier 270 may access the enhanced caller identification subscribers 247 to determine whether the called party subscribes to enhanced caller identification for incoming telephone calls. The subscription status options may be similar to the subscription status options of calling parties, such as active, inactive and user never subscribed, inactive by cancellation, and inactive for failure to pay. The enhanced caller identification subscription verifier 270 may take similar actions with respect to the called party for each of these subscriber statuses as compared to the calling party. If either of the called party or the calling party is an active subscriber to the service, then the enhanced caller identification subscription verifier 270 may instruct the enhanced caller identification information identifier 275 to determine the additional data to include in the telephone call notification.

The one or more processors 210 may implement, through the execution of computer-executable instructions stored in the memory 215, the enhanced caller identification information identifier 275. The enhanced caller identification information identifier 275 may be similar to the enhanced caller identification information identifier 118 of FIG. 1. The enhanced caller identification information identifier 275 may analyze the device locations 255, the telephone call data 225, the user data 230, and external sources using the enhanced caller identification information models 235 and the enhanced caller identification information rules 240. Based on the analysis, the enhanced caller identification information identifier 275 may identify additional information to include in the telephone call notification. The additional information may include a logo, image of the calling party, the likely subject matter of the telephone call, and/or any other similar information.

The enhanced caller identification information rules 240 may include various rules for selecting and displaying the additional information for the telephone call notification. Some of the rules may be generated by the model trainer 285 and other rules may be specified by various users of the enhanced caller identification service. Some rules that users may specify including a particular logo, image, and/or subject to include in the telephone call notification. Some of the rules may specify logos, images, and/or subject to include based on the day, time, and/or location of the calling device. For example, if the location is at the business address of the user and the time is between 9 am and 5 pm on Monday through Friday, then the user may specify to display a company logo. The enhanced caller identification data 257 may store the logo. In some instances, the user may place telephone calls related to certain topics during certain times of the day. For example, if the location is at the business address of the user and the time is between 10 am and 12 pm on Monday through Friday, then the user may specify to include a subject of lumber delivery along with the logo. As another example, if the location is at the home of the user and the time is between 6 pm and 9 pm, then the user may specify to display an image of the user. The enhanced caller identification data 257 may store the image.

The enhanced caller identification information identifier 275 analyze the device locations 255, the telephone call data 225, and the user data 230 using the enhanced caller identification information models 235 and the enhanced caller identification information rules 240 to determine the likely subject of the current telephone call from the calling party. The enhanced caller identification information rules 240 may be configured to specify a particular subject if certain conditions exist in the characteristics of the calling device, the calling party, and/or the called party, the device locations 255, the telephone call data 225, and/or the user data 230. The enhanced caller identification information models 235 may be configured to receive the characteristics of the calling device, the calling party, and/or the called party, the device locations 255, the telephone call data 225, and/or the user data 230 and output data indicating the likely subject of the current telephone call.

The one or more processors 210 may implement, through the execution of computer-executable instructions stored in the memory 215, a model trainer 285. The model trainer 285 may be configured to analyze the historical data 250 to generate the enhanced caller identification information models 235 and/or the enhanced caller identification information rules 240. In some implementations, the enhanced caller identification information models 235 and/or the enhanced caller identification information rules 240 may include models and/or rules generated elsewhere. The historical data 250 may include data similar to the device locations 255, the telephone call data 225, and/or the user data 230 for previous telephone calls and characteristics of those previous telephone calls. This data may include, for each previous telephone call, the phone number of the calling device, the phone number of the called device, the date, the time, the location of the calling device, the location of the called device, a type of the called device, a type of the calling device, date and time of one or more previous calls or text-based communications of the called device, date and time of a one or more previous calls or text-based communications of the calling device, transcriptions of the one or more previous calls or text-based communications of the called device, transcriptions of the one or more previous calls or text-based communications of the calling device, caller identification information of the calling device, caller identification information of the called device, a website of the party identified in the caller identification information, social media information of the party identified in the caller identification information, and/or any other similar information. The characteristics may also include the subject matter of the previous telephone calls and/or logos or images relevant to the calling parties of the previous telephone calls.

The model trainer 285 may generate enhanced caller identification information rules 240 that are configured to identify a likely subject of the current telephone call by identifying patterns in the historical data 250. The model trainer 285 may identify patterns that correspond to the same subjects. For example, the model trainer 285 may determine that telephone calls from a certain telephone number at a hospital are related to scheduling and telephone calls from a different telephone number at the hospital are related to billing. As another example, the model trainer 285 may determine that text-based communications between two particular phone numbers are related to childcare. Based on those patterns, the model trainer 285 may generate rules that specify likely subjects for telephone calls with similar patterns.

Some of the enhanced caller identification information rules 240 for identifying a subject may be specified by a user. These may include rules that indicate a likely subject for a telephone call if certain conditions exist. For example, the conditions may include that if a telephone call is from a certain number during a certain time of day, then the rule indicates that the likely subject is scheduling. As another example, if a telephone call is between two specific phone numbers, then the likely subject is food delivery. In some instances, rules specified by a user may have a higher priority than rules generated by the model trainer 285. In this case, if a rule specified by a user indicates one subject and a rule generated by the model trainer 285 indicates another subject, then the selected likely subject may be the one from the rule specified by the user.

The model trainer 285 may be configured to train enhanced caller identification information models 235 that are configured to identify a likely subject of an incoming telephone call. The models may be configured to receive data related to an incoming telephone call and output data indicating a likely subject of the incoming telephone call. The data related to an incoming telephone call may include the phone number of the calling device, the phone number of the called device, the date, the time, the location of the calling device, the location of the called device, a type of the called device, a type of the calling device, date and time of one or more previous calls or text-based communications of the called device, date and time of a one or more previous calls or text-based communications of the calling device, transcriptions of the one or more previous calls or text-based communications of the called device, transcriptions of the one or more previous calls or text-based communications of the calling device, caller identification information of the calling device, caller identification information of the called device, a website of the party identified in the caller identification information, social media information of the party identified in the caller identification information, and/or any other similar information. This model trainer 285 may also train the models using this type of data.

The model trainer 285 may train the enhanced caller identification information models 235 that are configured to identify a likely subject of an incoming telephone call using the historical data 250 and machine learning. The model trainer 285 may generate data samples based on previous telephone calls. Each data sample may reflect the characteristics of a telephone call and the participating devices along with the subject of the telephone call. The model trainer 285 may generate a data sample for each telephone call that has data in the historical data 250. The historical data 250 may include different types of data for each telephone call. For example, the data for some telephone calls may include the subject matter of the telephone call, the phone number of the calling device, the phone number of the called device, the date, the time, the location of the calling device, and the location of the called device. Data for other telephone calls may include the subject matter of the telephone call, the phone number of the calling device, the phone number of the called device, a type of the called device, a type of the calling device, and a date and time of one or more previous calls or text-based communications of the calling device.

The model trainer 285 may group data samples that include similar types of data. For example, the model trainer 285 may group the data samples that include the subject matter of the telephone call, the phone number of the calling device, the phone number of the called device, the date, the time, the location of the calling device, and the location of the called device. The model trainer 285 may group the data samples that include the subject matter of the telephone call, the phone number of the calling device, the phone number of the called device, a type of the called device, a type of the calling device, and a date and time of one or more previous calls or text-based communications of the calling device. The model trainer 285 may train, using machine learning, a model using each group of data samples. The resulting models may be configured to receive similar types of data as the data samples the model trainer 285 used for training. In response to receiving the data, each model may be configured to output a likely subject matter of the corresponding telephone call.

The enhanced caller identification information identifier 275 may include a subject matter identifier 280. The subject matter identifier 280 may be configured to use the enhanced caller identification information models 235 and/or the enhanced caller identification information rules 240 to identify the likely subject of an incoming telephone call. The subject matter identifier 280 may receive characteristics of the incoming telephone call such as the phone number of the calling device, the phone number of the called device, the date, the time, the location of the calling device, and a transcription of the previous telephone call between the calling device and the called device. The subject matter identifier 280 may access the enhanced caller identification information rules 240 and determine whether there are one or more rules that specify a likely subject based on the characteristics of the incoming telephone. The subject matter identifier 280 may access the enhanced caller identification information models 235 and select a model that is configured to receive the type of data included in the characteristics of the incoming telephone call. The subject matter identifier 280 may provide the characteristics of the incoming telephone call to the selected model and the model may output a likely subject of the incoming telephone call. The subject matter identifier 280 may compare the identified subject from the enhanced caller identification information models 235 and/or the enhanced caller identification information rules 240. If the likely subjects match, then the subject matter identifier 280 may provide the subject to the caller identification information application 265. If the likely subjects do not match, then the subject matter identifier 280 may select the subject from the rule or model with the highest priority, such as a rule provided by a user. In some instances, the subject matter identifier 280 may provide each of the identified subject to the caller identification information application 265.

The enhanced caller identification information identifier 275 may analyze the device locations 255, the telephone call data 225, and the user data 230 using the enhanced caller identification information models 235 and the enhanced caller identification information rules 240 to identify a logo or image representative of the calling party of the current telephone call. The enhanced caller identification information rules 240 may be configured to specify a particular logo or image if certain conditions exist in the characteristics of the calling device, the calling party, and/or the called party, the device locations 255, the telephone call data 225, and/or the user data 230. The enhanced caller identification information models 235 may be configured to receive the characteristics of the calling device, the calling party, and/or the called party, the device locations 255, the telephone call data 225, and/or the user data 230 and output data indicating a logo or image representative of the calling party of the current telephone call.

The model trainer 285 may generate enhanced caller identification information rules 240 that are configured to identify a logo or image representative of the calling party of the current telephone call by identifying patterns in the historical data 250. The model trainer 285 may identify patterns that correspond to the same logos or images. These logos or images may be ones specified by the calling party. For example, the model trainer 285 may determine that telephone calls from a group of telephone numbers have callers that specify to include a logo of Acme Shipping company. As another example, the model trainer 285 may determine that communications from another phone number between the hours of 9 am-5 pm on Monday through Friday may have a caller that specifies to include a photo of a person. Based on those patterns, the model trainer 285 may generate rules that specify a logo or image representative of the calling party of the current telephone call with similar patterns.

Some of the enhanced caller identification information rules 240 for including a logo or image may be specified by a user. These may include rules that indicate a logo or image to present for a telephone call if certain conditions exist. For example, the conditions may include that if a telephone call is from a certain number during a certain time of day, then the rule indicates to present a specific logo. As another example, if a telephone call is between two specific phone numbers, then a rule may specify to display a particular photo of a person. In some instances, rules specified by a user may have a higher priority than rules generated by the model trainer 285. In this case, if a rule specified by a user indicates logo or image and a rule generated by the model trainer 285 indicates logo or image, then the selected likely subject may be the one from the rule specified by the user.

The model trainer 285 may be configured to train enhanced caller identification information models 235 that are configured to identify a logo or image representative of the calling party of the current telephone call. The models may be configured to receive data related to an incoming telephone call and output data indicating a logo or image representative of the calling party of the current telephone call. The data related to an incoming telephone call may include the phone number of the calling device, the phone number of the called device, the date, the time, the location of the calling device, the location of the called device, a type of the called device, a type of the calling device, date and time of one or more previous calls or text-based communications of the called device, date and time of a one or more previous calls or text-based communications of the calling device, transcriptions of the one or more previous calls or text-based communications of the called device, transcriptions of the one or more previous calls or text-based communications of the calling device, caller identification information of the calling device, caller identification information of the called device, a website of the party identified in the caller identification information, social media information of the party identified in the caller identification information, and/or any other similar information. This model trainer 285 may also train the models using this type of data.

The model trainer 285 may train the enhanced caller identification information models 235 that are configured to identify a logo or image representative of the calling party of the current telephone call using the historical data 250 and machine learning. The model trainer 285 may generate data samples based on previous telephone calls. Each data sample may reflect the characteristics of a telephone call and the participating devices along with a logo or image representative of the calling party of the current telephone call. The model trainer 285 may generate a data sample for each telephone call that has data in the historical data 250. The historical data 250 may include different types of data for each telephone call. For example, the data for some telephone calls may include the logo or image representative of the calling party of the current telephone call, the phone number of the calling device, the phone number of the called device, the date, the time, the location of the calling device, and website data of the calling party. Data for other telephone calls may include a logo or image representative of the calling party of the current telephone call, the phone number of the calling device, the phone number of the called device, a type of the called device, a type of the calling device, social media data of the calling party, and a date and time of one or more previous calls or text-based communications of the calling device.

The model trainer 285 may group data samples that include similar types of data. For example, the model trainer 285 may group the data samples that include the logo or image representative of the calling party of the current telephone call, the phone number of the calling device, the phone number of the called device, the date, the time, the location of the calling device, caller identification data of the calling party, website data of the calling party, and the location of the called device. The model trainer 285 may group the data samples that include the logo or image representative of the calling party of the current telephone call, the phone number of the calling device, the phone number of the called device, a type of the called device, a type of the calling device, social media data of the calling party, caller identification information of the calling party, and a date and time of one or more previous calls or text-based communications of the calling device. The model trainer 285 may train, using machine learning, a model using each group of data samples. The resulting models may be configured to receive similar types of data as the data samples the model trainer 285 used for training. In some instances, the models may access the websites and/or social media information of the calling party based on the received data. In response to receiving the data, each model may be configured to output a logo or image representative of the calling party of the current telephone call.

The enhanced caller identification information identifier 275 may include an image identifier 282. The image identifier 282 may be configured to use the enhanced caller identification information models 235 and/or the enhanced caller identification information rules 240 to identify a logo or image representative of the calling party of the current telephone call. The image identifier 282 may receive characteristics of the incoming telephone call such as the phone number of the calling device, the phone number of the called device, the date, the time, the location of the calling device, a transcription of the previous telephone call between the calling device and the called device, and caller identification information of the calling party. The image identifier 282 may access the enhanced caller identification information rules 240 and determine whether there are one or more rules that specify a logo or image representative of the calling party of the current telephone call. The image identifier 282 may access the enhanced caller identification information models 235 and select a model that is configured to receive the type of data included in the characteristics of the incoming telephone call. The image identifier 282 may provide the characteristics of the incoming telephone call to the selected model and the model may output a likely subject of the incoming telephone call. In some instances, the model may identify and access a website of the calling party and/or social media information of the calling party. The image identifier 282 may compare the identified image or logo from the enhanced caller identification information models 235 and/or the enhanced caller identification information rules 240. If the images or logos match, then the subject matter identifier 280 may provide the images or logos to the caller identification information application 265. If the images or logos do not match, then the image identifier 282 may select the subject from the rule or model with the highest priority, such as a rule provided by a user. In some instances, the image identifier 282 may provide each of the images or logos to the caller identification information application 265.

The caller identification information application 265 may receive the images or logos and/or the likely subject. The caller identification information application 265 may include the images or logos and/or the likely subject in the telephone call notification and provide the notification to the called device. In some instances, the telephone call notification may include instructions for the called device to display the images or logos and/or the likely subject to the called party.

Figure 3:
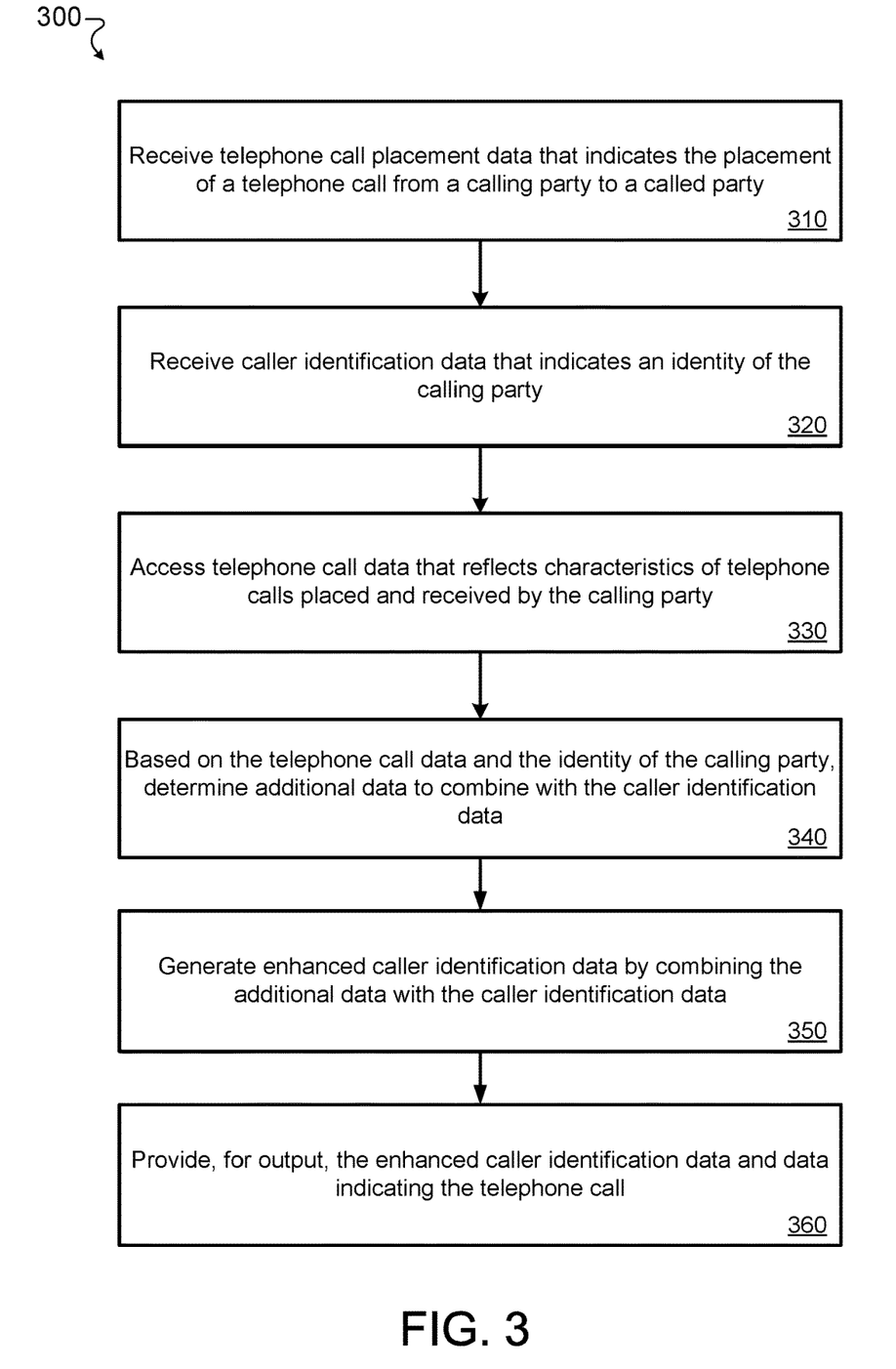
FIG. 3 is a flowchart of an example process for automatically generating enhanced caller identification information for presentation to a called party.

FIG. 3 is a flowchart of an example process 300 for automatically generating enhanced caller identification information for presentation to a called party. In general, the process 300 analyzes data related to an incoming telephone call. Based on analyzing that data, the process 300 determines whether to include enhanced caller identification data in the caller identification data provided to the called device. The enhanced caller identification data may include a likely subject of the call and/or a logo or image that represents the calling party. The process 300 will be described as being performed by the server 134 of FIG. 1 and will include references to other components in FIG. 1. In some implementations, the process 300 may be performed by the server 200 of FIG. 2.

The server 134 receives telephone call placement data that indicates the placement of a telephone call from a calling party to a called party (310). In some implementations, the telephone call placement data may include a phone number of the calling party and a phone number of the called party.

The server 134 receives caller identification data that indicates an identity of the calling party (320). In some implementations, the server 134 may access the caller identification data from caller identification information 126 that is stored locally on the server 134 or on another device on a network of the server 134. In some implementations, the server 134 may access the caller identification data from a third-party device. The caller identification data may be a name of a person, a name of an entity that the calling party represents, or any other similar identifying information. In some implementations, the server 134 may receive caller identification data of the called party. In some implementations, the server 134 may receive data indicating a location of the calling party, a location of the called party, a type of the calling device used by the calling party, a type of called device used by the called party, and/or any other similar information.

The server 134 accesses telephone call data that reflects characteristics of telephone calls placed and received by the calling party (330). In some implementations, the telephone call data includes, for each telephone call or text-based communication placed and received by the calling party, data identifying a respective called party and a respective calling party, data indicating a location of the respective called party and the respective calling party, data indicating the date, time, and the duration of the respective telephone call, data indicating whether the respective called party answered the respective telephone call, data indicating whether a voicemail system answered the respective telephone call, and data indicating whether the respective calling party left a voicemail. The telephone call data may also include, for each telephone call or text-based communication placed and received by the calling party, a type of the called device, a type of the calling device, a transcription or chat log, caller identification information of the calling device, caller identification information of the called device, a website of the party identified in the caller identification information, social media information of the party identified in the caller identification information, and/or any other similar information.

In some implementations, the telephone call data may include data indicating a first time period that a phone number of the calling party has been assigned to the calling party and data indicating a second time period that the phone number of the calling party was unassigned to a user before being assigned to the calling party. In some implementations, the telephone call data may include data indicating a first time period that a phone number of the called party has been assigned to the called party and data indicating a second time period that the phone number of the called party was unassigned to a user before being assigned to the called party. In some implementations, the telephone call data may include data indicating the subject matter of previous telephone calls and text-based communications between the calling party and the called party. In some implementations, the telephone call data may include the subject matter of previous telephone calls and text-based communications between the calling party and parties other than the called party.

In some implementations, the server 134 may train a model using machine learning and the telephone call data from previous telephone calls. The models may be configured to receive the phone number of the calling party, the phone number of the called party, the identity of the calling party, the identity of the called party, and/or telephone call data of the calling party and/or called party. The models may be configured to analyze the input and identify likely subject of the call and/or a logo or image that represents the calling party.

Based on the telephone call data and the identity of the calling party, the server 134 determines additional data to combine with the caller identification data (340). In some implementations, the additional data is a logo of the calling party. In some implementations, the additional data is the likely subject matter of the telephone call. In some implementations, the calling party may specify the additional data to combine with the caller identification data. The server 134 may providing the phone number of the calling party, the phone number of the called party, the identity of the calling party, the identity of the called party, and/or the telephone call data to the model. The model may output a likely subject of the call. The model may also identify a website and/or social media information related to the calling party. The model may analyze the website and/or social media information and identify a logo or image that represents the calling party.

In some implementations, the server 134 may confirm that the calling party and/or the called party has a valid subscription to the enhanced caller identification service. If the calling party and/or the called party has a valid subscription, then the server 134 may proceed with identifying the additional data. If neither the calling party nor called party have a valid subscription, then the server 134 may proceed output caller identification information without the additional data.

In some implementations, the server 134 may confirm that the calling party and the called party have communicated at least a threshold number of times. If the calling party and the called party have communicated at least a threshold number of times, then the server 134 may be more likely to correctly identify the likely subject because there may be previous communications in the telephone call data for the server 134 to analyze. In some implementations, the server 134 may identify a relevant logo or image even if the calling party and the called party have not communicated at least a threshold number of times.

The server 134 generates enhanced caller identification data by combining the additional data with the caller identification data (350). In some implementations, the server 134 may include instructions for the called device for how to output the additional data along with the caller identification data. For example, the instructions may indicate to place the logo below the caller identification data.

The server 134 provides, for output, the enhanced caller identification data and data indicating the telephone call (360). The enhanced caller identification data and data indicating the telephone call may be configured for display on the called device. The called device receives the enhanced caller identification data and data indicating the telephone call. The called device outputs a notification to alert the user of the incoming telephone call and displays the enhanced caller identification data on the display of the called device. The user may view the typical caller identification information of the name and number of the calling party. The user may also view the likely subject of the incoming call and/or a logo or image that represents the calling party. Based on the interface on the screen of the called device, the user may decide whether to answer the telephone call.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
   receiving, by a server, telephone call placement data that indicates the placement of a telephone call from a calling party to a called party;
   receiving, by the server, caller identification data that indicates an identity of the calling party;
   accessing, by the server, first telephone call data that reflects characteristics of telephone calls placed and received by the calling party;
   receiving, by the server, data indicating a first time period that a phone number of the calling party has been assigned to the calling party;
   receiving, by the server, data indicating a second time period that the phone number of the calling party was unassigned to a user before being assigned to the calling party;
   based on the first telephone call data, the identity of the calling party, the first time period, and the second time period, determining, by the server, additional data to combine with the caller identification data;
   generating, by the server, enhanced caller identification data by combining the additional data with the caller identification data; and
   providing, for output by the server, the enhanced caller identification data and data indicating the telephone call.

2. The method of claim 1, wherein the telephone call data that reflects characteristics of the telephone calls placed and received by the calling party comprises:
   for each telephone call:
      data identifying a respective called party and a respective calling party;
      data indicating a location of the respective called party and the respective calling party;
      data indicating the date, time, and the duration of the respective telephone call;
      data indicating whether the respective called party answered the respective telephone call;
      data indicating whether a voicemail system answered the respective telephone call; and
      data indicating whether the respective calling party left a voicemail.

3. The method of claim 1, wherein determining the additional data to combine with the caller identification data comprises identifying a logo of the calling party.

4. The method of claim 1, wherein determining the additional data to combine with the caller identification data comprises determining a subject matter of previous telephone calls between the calling party and the called party.

5. The method of claim 1, wherein determining the additional data to combine with the caller identification data comprises determining a subject matter of previous telephone calls between the calling party and parties other than the called party.

6. The method of claim 1, comprising:
   determining, by the server, that the calling party has a valid subscription to the enhanced caller identification service,
   wherein generating the enhanced caller identification data is based on determining that the calling party has the valid subscription to the enhanced caller identification service.

7. The method of claim 1, wherein determining the additional data to combine with the caller identification data comprises receiving, from the calling party, the additional data.

8. The method of claim 1, wherein determining the additional data to combine with the caller identification data is further based on an identity of the called party.

9. The method of claim 1, comprising:
   determining, by the server, that the calling party and the called party have communicated at least a threshold number of times,
   wherein determining the additional data to combine with the caller identification data is further based on determining that the calling party and the called party have communicated at least a threshold number of times.

10. The method of claim 1, wherein the telephone call data that reflects characteristics of the telephone calls placed and received by the calling party comprises:
for each telephone call:
data identifying a respective called party and a respective calling party;
data indicating a location of the respective called party and the respective calling party;
data indicating the date, time, and the duration of the respective telephone call;
data indicating whether the respective called party answered the respective telephone call;
data indicating whether a voicemail system answered the respective telephone call; and
data indicating whether the respective calling party left a voicemail.

11. The method of claim 1, wherein determining the additional data to combine with the caller identification data comprises identifying a logo of the calling party.

12. The method of claim 1, wherein determining the additional data to combine with the caller identification data comprises determining a subject matter of previous communications of the calling party and the called party.

13. The method of claim 1, wherein the actions comprise:
determining, by the server, that the calling party has a valid subscription to the enhanced caller identification service,
wherein generating the enhanced caller identification data is based on determining that the calling party has the valid subscription to the enhanced caller identification service.

14. The method of claim 1, wherein determining the additional data to combine with the caller identification data comprises receiving, from the calling party, the additional data.

15. The method of claim 1, wherein determining the additional data to combine with the caller identification data is further based on an identity of the called party.

16. A system, comprising:
one or more processors; and
memory including a plurality of computer-executable components that are executable by the one or more processors to perform a plurality of actions, the plurality of actions comprising:
receiving, by a server, telephone call placement data that indicates the placement of a telephone call from a calling party to a called party;
receiving, by the server, caller identification data that indicates an identity of the calling party;
accessing, by the server, first telephone call data that reflects characteristics of telephone calls placed and received by the calling party;
receiving, by the server, data indicating a first time period that a phone number of the calling party has been assigned to the calling party;
receiving, by the server, data indicating a second time period that the phone number of the calling party was unassigned to a user before being assigned to the calling party;
based on the first telephone call data, the identity of the calling party, the first time period, and the second time period, determining, by the server, additional data to combine with the caller identification data;
generating, by the server, enhanced caller identification data by combining the additional data with the caller identification data; and
providing, for output by the server, the enhanced caller identification data and data indicating the telephone call.

17. The system of claim 16, wherein the actions comprise:
determining, by the server, that the calling party and the called party have communicated at least a threshold number of times,
wherein determining the additional data to combine with the caller identification data is further based on determining that the calling party and the called party have communicated at least a threshold number of times.

18. One or more non-transitory computer-readable media of a computing device storing computer-executable instructions that upon execution cause one or more computers to perform acts comprising:
receiving, by a server, telephone call placement data that indicates the placement of a telephone call from a calling party to a called party;
receiving, by the server, caller identification data that indicates an identity of the calling party;
accessing, by the server, first telephone call data that reflects characteristics of telephone calls placed and received by the calling party;
receiving, by the server, data indicating a first time period that a phone number of the calling party has been assigned to the calling party;
receiving, by the server, data indicating a second time period that the phone number of the calling party was unassigned to a user before being assigned to the calling party;
based on the first telephone call data, the identity of the calling party, the first time period, and the second time period, determining, by the server, additional data to combine with the caller identification data;
generating, by the server, enhanced caller identification data by combining the additional data with the caller identification data; and
providing, for output by the server, the enhanced caller identification data and data indicating the telephone call.

19. The media of claim 18, wherein the telephone call data that reflects characteristics of the telephone calls placed and received by the calling party comprises:
for each telephone call:
data identifying a respective called party and a respective calling party;
data indicating a location of the respective called party and the respective calling party;
data indicating the date, time, and the duration of the respective telephone call;
data indicating whether the respective called party answered the respective telephone call;
data indicating whether a voicemail system answered the respective telephone call; and
data indicating whether the respective calling party left a voicemail.

20. The media of claim 18, wherein the acts comprise:
determining, by the server, that the calling party and the called party have communicated at least a threshold number of times,
wherein determining the additional data to combine with the caller identification data is further based on determining that the calling party and the called party have communicated at least a threshold number of times.

* * * * *